United States Patent
Adam et al.

(10) Patent No.: US 10,279,807 B2
(45) Date of Patent: May 7, 2019

(54) SYSTEM AND METHOD FOR PREDICTING A POSSIBLE LANE DEPARTURE WHEN DRIVING A VEHICLE AUTONOMOUSLY OR SEMI-AUTONOMOUSLY, AND FOR TAKING A REMEDIAL ACTION TO PREVENT A LANE DEPARTURE

(71) Applicant: GM Global Technology Operations LLC, Detroit, MI (US)

(72) Inventors: Paul A. Adam, Milford, MI (US); Kevin K. Hoang, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 87 days.

(21) Appl. No.: 15/435,922

(22) Filed: Feb. 17, 2017

(65) Prior Publication Data
US 2018/0237007 A1    Aug. 23, 2018

(51) Int. Cl.
*B60W 30/12* (2006.01)
*B60W 50/14* (2012.01)

(52) U.S. Cl.
CPC ............ *B60W 30/12* (2013.01); *B60W 50/14* (2013.01); *B60W 2050/143* (2013.01); *B60W 2420/42* (2013.01); *B60W 2520/06* (2013.01); *B60W 2720/24* (2013.01)

(58) Field of Classification Search
CPC ................. B60W 30/12; B60W 50/14; B60W 2050/143; B60W 2720/24; B60W 2420/42; B60W 2520/06
See application file for complete search history.

(56) References Cited

U.S. PATENT DOCUMENTS

| | | | |
|---|---|---|---|
| 6,208,927 B1* | 3/2001 | Mine | B60K 31/0058 701/70 |
| 8,700,324 B2* | 4/2014 | Halder | G01C 21/165 701/408 |
| 8,948,954 B1* | 2/2015 | Ferguson | B60W 30/12 701/23 |
| 2008/0065328 A1* | 3/2008 | Eidehall | G01S 7/295 701/301 |
| 2008/0258884 A1* | 10/2008 | Schmitz | G01S 13/931 340/425.5 |
| 2011/0231095 A1* | 9/2011 | Nakada | B60W 30/12 701/301 |

(Continued)

*Primary Examiner* — Hussein Elchanti
*Assistant Examiner* — Majdi Alsomiri

(57) ABSTRACT

A system according to the present disclosure includes a lane boundary module, a vehicle trajectory module, an intersection location module, a lane departure module, and a driver warning module. The lane boundary module is configured to determine a boundary of a lane within which a vehicle is travelling. The vehicle trajectory module is configured to predict a trajectory of the vehicle. The intersection location module is configured to determine M locations of M intersections between the vehicle trajectory and the lane boundary at M times, where M is an integer greater than one. The lane departure module is configured to identify a potential lane departure based on the M locations. The driver warning module is configured to activate a driver warning device to warn a driver when the potential lane departure is identified.

18 Claims, 5 Drawing Sheets

(56) References Cited

U.S. PATENT DOCUMENTS

| | | | |
|---|---|---|---|
| 2012/0221168 A1* | 8/2012 | Zeng | G08G 1/09626 |
| | | | 701/1 |
| 2016/0221575 A1* | 8/2016 | Posch | B60W 50/0098 |
| 2017/0008521 A1* | 1/2017 | Braunstein | G01C 21/32 |
| 2017/0036678 A1* | 2/2017 | Takamatsu | B60W 10/04 |
| 2017/0120909 A1* | 5/2017 | Oniwa | B60W 30/143 |
| 2017/0236422 A1* | 8/2017 | Naka | B60W 30/09 |
| | | | 701/301 |
| 2017/0336788 A1* | 11/2017 | Iagnemma | G05D 1/0038 |
| 2018/0032080 A1* | 2/2018 | Oska | G05D 1/0219 |
| 2018/0086338 A1* | 3/2018 | Yamada | B60W 30/0956 |

\* cited by examiner

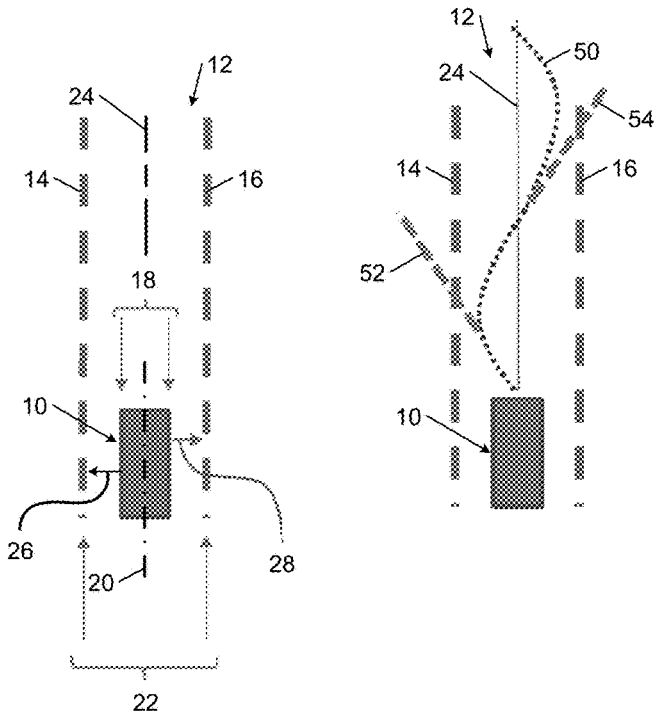
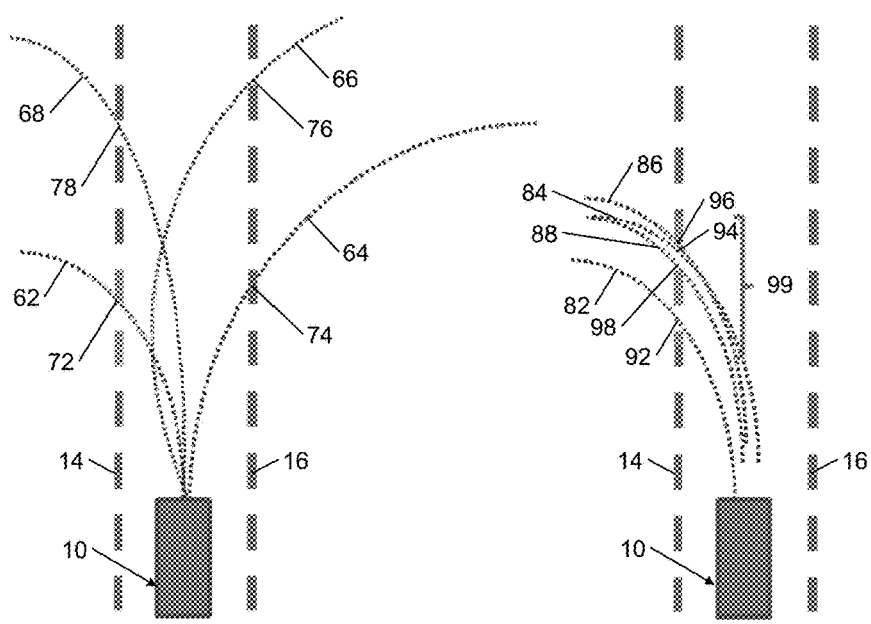
FIG. 1A FIG. 1B
FIG. 2A FIG. 2B

SYSTEM AND METHOD FOR PREDICTING A POSSIBLE LANE DEPARTURE WHEN DRIVING A VEHICLE AUTONOMOUSLY OR SEMI-AUTONOMOUSLY, AND FOR TAKING A REMEDIAL ACTION TO PREVENT A LANE DEPARTURE

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for predicting a possible lane departure when driving a vehicle autonomously or semi-autonomously, and for taking a remedial action to prevent a lane departure.

Autonomous driving systems drive a vehicle completely independent of a human driver. For example, autonomous driving systems control the acceleration, brake, and steering systems of a vehicle independent of a driver. Semiautonomous driving systems drive a vehicle partially independent of a human driver. For example, a semiautonomous driving system may control the steering system independent of a driver while relying on the driver to set a target speed for the semiautonomous driving system to achieve by controlling the acceleration and brake systems.

When driving a vehicle autonomously or semi-autonomously at highway speeds, the amount of time that it would take for the vehicle to depart from a lane is travelling is minimal due to basic vehicle kinematics. For example, referring to FIG. 1A, a vehicle 10 is shown travelling within a lane 12 having a left boundary 14 and a right boundary 16. The vehicle 10 has a width 18 and a longitudinal axis 20, and the lane 12 has a width 22 and a centerline 24 disposed at a midpoint of the width 22. The longitudinal axis 20 of the vehicle 10 is aligned with the centerline 24 of the lane 12. Thus, a distance 26 from the left side of the vehicle 10 to the left boundary 14 is equal to a distance 28 from the right side of the vehicle 10 to the right boundary 16.

The distances 26 and 28 are also the distances that the vehicle 10 must travel before crossing the left and right boundaries 14 and 16, respectively. The time required for the vehicle 10 to cross one of the lane boundaries 14 or 16 is equal to the corresponding one of the distances 26 or 28 divided by the lateral speed of the vehicle 10. For United States highways, the width 22 of the lane 12 is typically 3.5 meters (m). Thus, if the width 18 of the vehicle 10 is 2 m, each of the distances 26 and 28 is equal to 0.75 m. Further, if the vehicle 10 has a lateral speed of 75 miles per hour (33.5 meters per second), the time required for the vehicle 10 to cross one of the lane boundaries 14 or 16 is 0.02 seconds. Thus, if the vehicle 10 is driven autonomously or semi-autonomously and the path the vehicle 10 starts to depart from the centerline 24 of the lane 12, the driving system has 0.02 seconds to correct the path of the vehicle 10 before the vehicle 10 crosses one of the lane boundaries 14 or 16.

SUMMARY

A system according to the present disclosure includes a lane boundary module, a vehicle trajectory module, an intersection location module, a lane departure module, and a driver warning module. The lane boundary module is configured to determine a boundary of a lane within which a vehicle is travelling. The vehicle trajectory module is configured to predict a trajectory of the vehicle. The intersection location module is configured to determine M locations of M intersections between the vehicle trajectory and the lane boundary at M times, where M is an integer greater than one. The lane departure module is configured to identify a potential lane departure based on the M locations. The driver warning module is configured to activate a driver warning device to warn a driver when the potential lane departure is identified.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 1A and 1B are schematics illustrating a vehicle being maintained within lane boundaries by a driving control module according to the principles of the present disclosure;

FIG. 2A is a schematic illustrating example trajectories of a vehicle when the vehicle is maintained within lane boundaries by a driving control module according to the principles of the present disclosure;

FIG. 2B is a schematic illustrating example trajectories of a vehicle that may cause a lane departure module according to the principles of the present disclosure to identify a potential lane departure;

In the drawings, reference numbers may be reused to identify similar and/or identical elements.

DETAILED DESCRIPTION

Figure 3:
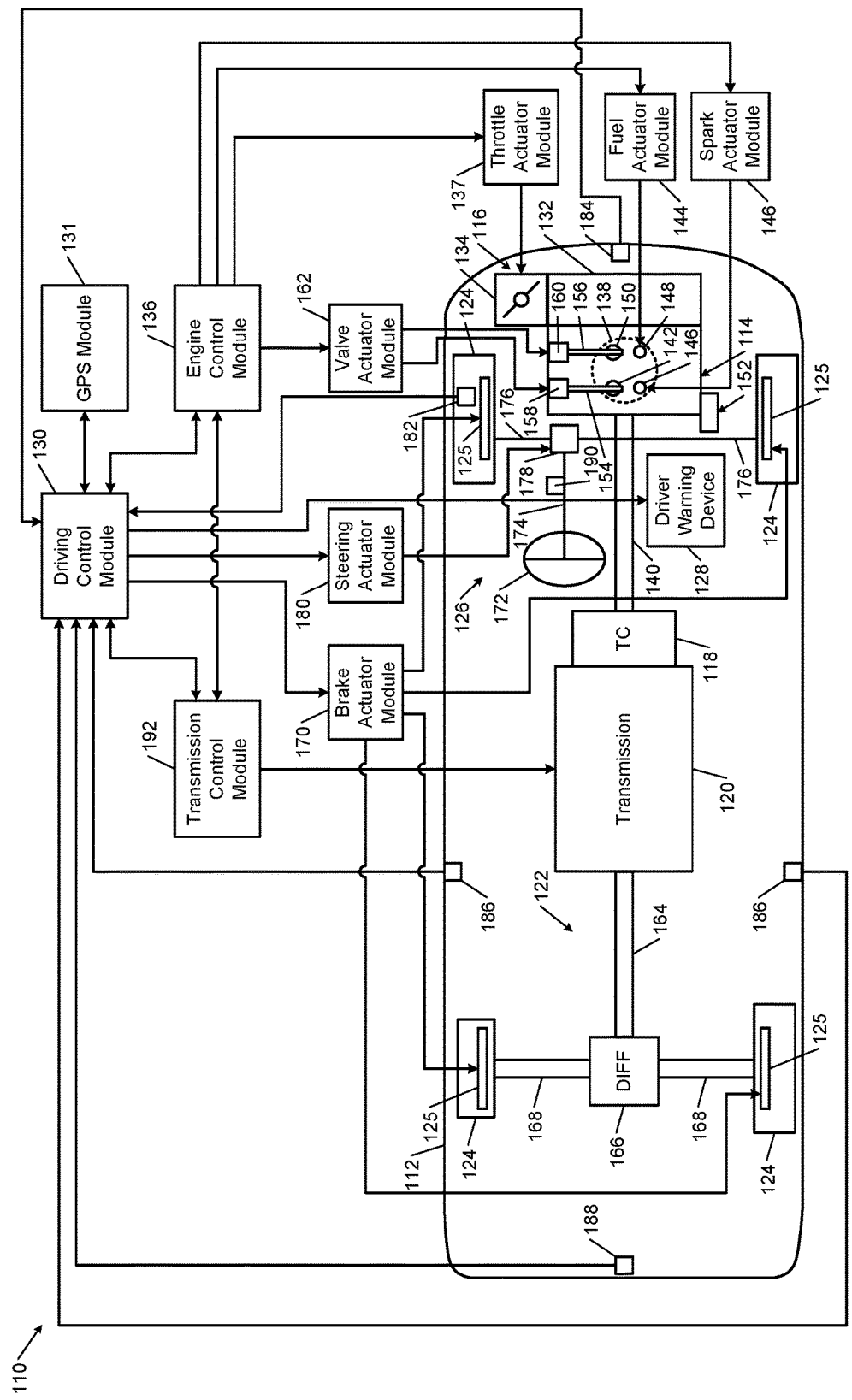
FIG. 3 is a functional block diagram of an example vehicle according to the principles of the present disclosure.

Autonomous and semi-autonomous driving systems typically steer a vehicle in a sinusoidal path as the systems make steering corrections to maintain the vehicle within the boundaries of a lane. For example, referring to FIG. 1B, an autonomous or semi-autonomous driving system steers the vehicle 10 in sinusoidal path 50 as the driving system makes steering corrections to maintain the vehicle 10 within the left and right lane boundaries 14 and 16. The centerline 24 of the lane 12 may be a desired path of the vehicle 10, and the sinusoidal path 50 may be an actual path of the vehicle 10.

Thus, the autonomous or semi-autonomous driving system may control a steering system of the vehicle 10 to minimize the difference between the actual path of the vehicle 10 and the desired path of the vehicle 10.

Some autonomous or semi-autonomous driving systems use vehicle kinematics to predict the trajectory (e.g., forward path) of a vehicle, and determine whether the vehicle is likely to cross a lane boundary based on the vehicle trajectory. For example, referring again to FIG. 1B, an autonomous or semi-autonomous driving system may predict a first trajectory 52 of the vehicle 10 at a first time and a second trajectory 54 of the vehicle 10 at a second time. The system may determine the period required for the vehicle 10 to cross one of the lane boundaries 14 or 16 when travelling along each of the first and second trajectories 52 and 54. The system may warn the driver of a potential lane departure when the period is less than a threshold.

Since the actual path of the vehicle 10 is sinusoidal as shown in FIG. 1B, making instantaneous predictions of trajectory of the vehicle 10 as described above does not provide an accurate way of identifying a potential lane departure. Predicting a vehicle trajectory at a specific instance in time provides a poor estimate of the time at which a vehicle will depart from a lane since the estimate does not account for future steering control moves that will correct the vehicle path. Even at modest lateral vehicle speeds such as 25 miles per hour (11.1 meters per second), a vehicle may travel the distance from one side of the vehicle to the corresponding lane boundary in less than 1 second. Thus, identifying a potential lane departure using kinematics alone may not provide sufficient advanced warning to a driver in order to enable the driver to take control of the vehicle before the lane departure.

A system and method according to the present disclosure characterizes the behavior of a steering control system using statistical data and identifies a potential lane departure when the steering control system behavior is deviating from normal behavior. When a potential lane departure is identified, the system and method warns the diver of the potential lane departure so that the driver may take control of the vehicle before the vehicle departs from the lane. This approach minimizes the number of false alerts while maximizing the amount of warning time that is provided to the driver.

The statistical data used to characterize the steering control system includes a measure of the typical variation in the locations where the predicted vehicle trajectories intersect the lane boundaries. For example, FIG. 2A illustrates predicted trajectories of the vehicle 10 when the steering control system (or autonomous/semi-autonomous driving system) of the vehicle 10 is behaving normally. The predicted trajectories of the vehicle 10 include a first trajectory 62 predicted at a first time, a second trajectory 64 predicted at a second time, a third trajectory 66 predicted at a third time, and a fourth trajectory 68 predicted at a fourth time. The first through fourth trajectories 62-68 may be predicted using a kinematic model of the vehicle 10.

As shown in FIG. 2A, there is a lot of variance between the locations where the predicted trajectories of the vehicle 10 intersect the left and right boundaries 14 and 16 of the lane 12. For example, the first trajectory 62 intersects the left boundary 14 at a first location 72, the second trajectory 64 intersects the right boundary 16 at a second location 74, the third trajectory 66 intersects the right boundary 16 at a third location 76, and the fourth trajectory 68 intersects the left boundary 14 at a fourth location 78. The second location 74 is on an opposite side of the lane 12 relative to the first location 72, the third location 76 is significantly forward of the second location 74, and the fourth location 78 is on an opposite side of the lane 12 relative to the third location 76.

In contrast, FIG. 2B illustrates predicted trajectories of the vehicle 10 when the steering control system (or autonomous/semi-autonomous driving system) of the vehicle 10 is not behaving normally. In FIG. 2B, the predicted trajectories of the vehicle 10 include a first trajectory 82 predicted at a first time, a second trajectory 84 predicted at a second time, a third trajectory 86 predicted at a third time, and a fourth trajectory 88 predicted at a fourth time. The first through fourth trajectories 82-88 may be predicted using a kinematic model of the vehicle 10.

In FIG. 2B, there is little variation between the locations where the predicted trajectories of the vehicle 10 intersect the left and right boundaries 14 and 16 of the lane 12. For example, the first trajectory 82 intersects the left boundary 14 at a first location 92, the second trajectory 84 intersects the right boundary 16 at a second location 94, the third trajectory 86 intersects the right boundary 16 at a third location 96, and the fourth trajectory 88 intersects the left boundary 14 at a fourth location 98. The first through fourth locations 92-98 are all on the same side of the lane 12 and have a standard deviation 99 that is small relative to the standard deviation of the distances between the first through fourth locations 72-78 shown in FIG. 2A.

A system and method according to the present disclosure uses a statistical measure of the variation between the locations where the predicted vehicle trajectories intersect the lane boundaries in order to identify a potential lane departure. In one example, the system and method determines the distances between each pair of consecutively determined intersection location (e.g., the distance between the first and second locations 92 and 94, the distance between the second and third locations 94 and 96, etc.). The system and method then identifies a potential lane departure when at least P (e.g., 25) of the last N (e.g., 30) distances are each less than a threshold.

Thus, a system and method according to the present disclosure uses both vehicle kinematics and statistical data characterizing normal system behavior in order to identify a potential lane departure. As noted above, this approach minimizes the number of false alerts while maximizing the amount of warning time that is provided to the driver. Also, if the driver does not take control of the vehicle within a certain period after a lane departure warning is issued, the system and method may take a corrective action (e.g., decelerating the vehicle) to prevent a lane departure.

Referring now to FIG. 3, a vehicle 110 includes a vehicle body 112, an engine 114, an intake system 116, a torque converter 118, a transmission 120, a driveline 122, wheels 124, friction brakes 125, a steering system 126, and a driver warning device 128. The engine 114 combusts an air/fuel mixture to produce drive torque for the vehicle 110. The amount of drive torque produced by the engine 114 is based on a driver input and/or a first input from a driving control module (DCM) 130. The driver input may be a signal indicating a position of an accelerator pedal. The first input from the DCM 130 may be a desired vehicle acceleration.

The DCM 130 may adjust the desired vehicle acceleration to maintain a desired vehicle speed and/or to maintain a predetermined following distance relative to an object in front of the vehicle 110. The DCM 130 may determine the desired vehicle speed based on the location of the vehicle 110 and a government speed limit for the road on which the vehicle 110 is travelling. The DCM 130 may determine the speed limit based on an input received from a global positioning system (GPS) module 131. The GPS module 131 may be onboard (e.g., part of) the vehicle 110 or the GPS module 131 may be remote from (e.g., separate from) the vehicle 110. The GPS module 131 includes a transceiver for communicating with a GPS satellite.

Air is drawn into the engine 114 through the intake system 116. The intake system 116 includes an intake manifold 132 and a throttle valve 134. The throttle valve 134 may include a butterfly valve having a rotatable blade. An engine control module (ECM) 136 controls a throttle actuator module 137, which regulates opening of the throttle valve 134 to control the amount of air drawn into the intake manifold 132.

Air from the intake manifold 132 is drawn into cylinders of the engine 114. While the engine 114 may include multiple cylinders, for illustration purposes a single representative cylinder 138 is shown. For example only, the engine 114 may include 2, 3, 4, 5, 6, 8, 10, and/or 12 cylinders. The ECM 136 may deactivate some of the cylinders, which may improve fuel economy under certain engine operating conditions.

The engine 114 may operate using a four-stroke cycle. The four strokes, described below, are named the intake stroke, the compression stroke, the combustion stroke, and the exhaust stroke. During each revolution of a crankshaft 140, two of the four strokes occur within the cylinder 138. Therefore, two crankshaft revolutions are necessary for the cylinder 138 to experience all four of the strokes.

During the intake stroke, air from the intake manifold 132 is drawn into the cylinder 138 through an intake valve 142. The ECM 136 controls a fuel actuator module 144, which regulates fuel injections performed by a fuel injector 145 to achieve a desired air/fuel ratio. Fuel may be injected into the intake manifold 132 at a central location or at multiple locations, such as near the intake valve 142 of each of the cylinders. In various implementations, fuel may be injected directly into the cylinders or into mixing chambers associated with the cylinders. The fuel actuator module 144 may halt injection of fuel to cylinders that are deactivated.

The injected fuel mixes with air and creates an air/fuel mixture in the cylinder 138. During the compression stroke, a piston (not shown) within the cylinder 138 compresses the air/fuel mixture. The engine 114 may be a compression-ignition engine, in which case compression in the cylinder 138 ignites the air/fuel mixture. Alternatively, the engine 114 may be a spark-ignition engine, in which case a spark actuator module 146 energizes a spark plug 148 to generate a spark in the cylinder 138 based on a signal from the ECM 136, which ignites the air/fuel mixture. The timing of the spark may be specified relative to the time when the piston is at its topmost position, referred to as top dead center (TDC).

The spark actuator module 146 may be controlled by a spark timing signal specifying how far before or after TDC to generate the spark. Because piston position is directly related to crankshaft rotation, operation of the spark actuator module 146 may be synchronized with crankshaft angle. In various implementations, the spark actuator module 146 may halt provision of spark to deactivated cylinders.

Generating the spark may be referred to as a firing event. The spark actuator module 146 may have the ability to vary the timing of the spark for each firing event. The spark actuator module 146 may even be capable of varying the spark timing for a next firing event when the spark timing signal is changed between a last firing event and the next firing event. In various implementations, the engine 114 may include multiple cylinders and the spark actuator module 146 may vary the spark timing relative to TDC by the same amount for all cylinders in the engine 114.

During the combustion stroke, combustion of the air/fuel mixture drives the piston down, thereby driving the crankshaft 140. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 150. The byproducts of combustion are exhausted from the vehicle via an exhaust system 152.

The intake valve 142 may be controlled by an intake camshaft 154, while the exhaust valve 150 may be controlled by an exhaust camshaft 156. In various implementations, multiple intake camshafts (including the intake camshaft 154) may control multiple intake valves (including the intake valve 142) for the cylinder 138 and/or may control the intake valves (including the intake valve 142) of multiple banks of cylinders (including the cylinder 138). Similarly, multiple exhaust camshafts (including the exhaust camshaft 156) may control multiple exhaust valves for the cylinder 38 and/or may control exhaust valves (including the exhaust valve 150) for multiple banks of cylinders (including the cylinder 138).

The time at which the intake valve 142 is opened may be varied with respect to piston TDC by an intake cam phaser 158. The time at which the exhaust valve 150 is opened may be varied with respect to piston TDC by an exhaust cam phaser 160. A valve actuator module 162 may control the intake and exhaust cam phasers 158, 160 based on signals from the ECM 136. When implemented, variable valve lift may also be controlled by the valve actuator module 162.

The valve actuator module 162 may deactivate the cylinder 138 by disabling opening of the intake valve 142 and/or the exhaust valve 150. The valve actuator module 162 may disable opening of the intake valve 142 by decoupling the intake valve 142 from the intake cam phaser 158. Similarly, the valve actuator module 162 may disable opening of the exhaust valve 150 by decoupling the exhaust valve 150 from the exhaust cam phaser 160. In various implementations, the valve actuator module 162 may control the intake valve 142 and/or the exhaust valve 150 using devices other than camshafts, such as electromagnetic or electrohydraulic actuators.

The ECM 136 adjusts the position of the throttle valve 134, the amount and/or timing of fuel injections performed by the fuel injector 145, the timing at which spark is generated by the spark plug 148, and/or the timing at which the intake and exhaust valves 142 and 150 are opened to achieve a desired torque output of the engine 114. The ECM 136 determines the desired engine torque based on the driver input and/or the first input from the DCM 130. The ECM 136 may determine whether to determine the desired engine torque based on the driver input or the first input based on a second input from the DCM 130. The DCM 130 may control whether the ECM 136 uses the driver input or the first input to determine the desired engine torque based on whether the driver's foot is on the accelerator pedal. The DCM 130 may determine that the driver's foot is on the accelerator pedal when the accelerator pedal position indicates a pedal depression level that is greater than a predetermined amount.

Torque output at the crankshaft 140 is transferred through the torque converter 118, through the transmission 120, through the driveline 122, and to the wheels 124. The driveline 122 includes a drive shaft 164, a differential 166, and axle shafts 168. The torque converter 118, the transmission 120, and the differential 166 amplify engine torque by several gear ratios to provide axle torque at the axle shafts 168. The axle torque rotates the wheels 124, which causes the vehicle 110 to accelerate in a forward or rearward direction.

The friction brakes 125 are mounted to the wheels 124. The friction brakes 125 resist rotation of the wheels 124 when the friction brakes 125 are applied. The friction brakes 125 may include drum brakes and/or disc brakes, and may include electrohydraulic actuators and/or electromechanical actuators that press a brake pad against a brake disc and/or drum when the friction brakes 125 are applied. A brake actuator module 170 applies the friction brakes 125 based on a brake pedal position and/or a signal from the DCM 130. The friction brakes 125 may be independently applied at different levels. The DCM 130 may apply the friction brakes 125 to maintain the desired vehicle speed and/or to maintain the predetermined following distance relative to an object in front of the vehicle 110.

The steering system 126 is operable to turn the front wheels 124 and thereby turn the vehicle 110. The steering system 126 includes a steering wheel 172, a steering column 174, one or more steering linkages 176, and a steering actuator 178. A driver may rotate the steering wheel 172 to turn the vehicle 110 left or right. The steering column 174 is coupled to the steering wheel 172 so that the steering column 174 rotates when the steering wheel 172 is rotated. The steering column 174 may also be coupled to the steering linkages 176 so that rotation of the steering column 174 causes translation of the steering linkages 176. The steering linkages 176 are coupled to the front wheels 124 so that translation of the steering linkages 176 turns the wheels 124.

The steering actuator 178 is coupled to the steering linkages 176 and is operable to translate the steering linkages 176 and thereby turn the front wheels 124. The steering actuator 178 may be an electrohydraulic and/or electromechanical actuator. If the steering column 174 is coupled to the steering linkages 176, the steering actuator 178 may reduce the amount of effort that the driver must exert to turn the vehicle 110 left or right. In various implementations, the steering column 174 may not be coupled to the steering linkages 176, and the steering actuator 178 alone may translate the steering linkages 176. In these implementations, the steering system 126 may be referred to as a steer-by-wire system.

A steering actuator module 180 adjusts actuation of the steering actuator 178 based on a signal from the DCM 130. The DCM 130 may control the steering actuator 178 based on the angular position of the steering wheel 172. Alternatively, the DCM 130 may control the steering actuator 178 autonomously (e.g., independent of the angular position of the steering wheel 172). For example, the DCM 130 may control the steering actuator 178 to minimize a difference between a desired path of the vehicle 110 and an actual path of the vehicle 110.

A wheel speed sensor 182 is mounted to one or more of the wheels 124 and measures the speed of wheels 124. A forward facing camera 184 is mounted to the front of the vehicle body 112 and generates an image of the environment in front of the vehicle 110. Side facing cameras 186 are mounted to the left and right sides of the vehicle body 112 and generate images of the environment on the left and right sides of the vehicle 110. An accelerometer 188 is mounted to (e.g., the rear of) the vehicle body 112 and measures the lateral, longitudinal, and/or vertical acceleration of the vehicle 110. The accelerometer 188 may include a triaxial accelerometer, a dual-axis accelerometer, and/or one or more single-axis accelerometers. In one example, the accelerometer 188 is a dual-axis accelerometer that measures the lateral and longitudinal acceleration of the vehicle 110.

A steering wheel angle sensor 190 measures the angular position of the steering wheel 172 relative to a predetermined position. The steering wheel 172 may be in the predetermined position when the vehicle 110 is traveling in a straight line. The steering wheel angle sensor 190 may be mounted to the steering column 174 and may include a Hall Effect sensor that measures the angular position of a shaft that is disposed within the steering column 174 and rotatably coupled to the steering wheel 172.

A transmission control module (TCM) 192 shifts gears of the transmission 120 based on operating conditions of the vehicle 110 and a predetermined shift schedule. The operating conditions may include the speed of the vehicle 110, a desired acceleration of the vehicle 110, and/or a desired torque output of the engine 114. The TCM 192 may determine the vehicle speed based on the wheel speed from the wheel speed sensor 182. The TCM 192 may receive the desired vehicle acceleration and/or the desired engine torque from the DCM 130 and/or the ECM 136. The ECM 136 may communicate with the TCM 192 to coordinate shifting gears in the transmission 120. For example, the ECM 136 may reduce engine torque during a gear shift.

The DCM 130 may adjust the desired path of the vehicle 110 to maintain the vehicle 110 within the boundaries of a lane in which the vehicle 110 is travelling. Further, the DCM 130 may repeatedly determine the trajectory (e.g., the future path) of the vehicle 110 and identify a potential lane departure based on the vehicle trajectories. Moreover, the DCM 130 may activate the driver warning device 128 to notify the driver of the potential lane departure.

The driver warning device 128 may include an electronic display (e.g., a touchscreen) that is within the view of the driver and is operable to display lights, text, and/or images. In addition, the driver warning device 128 may include a heads-up display (HUD) that, for example, projects light, text, and/or images onto a windshield (not shown) of the vehicle 110. Further, the driver warning device 128 may include one or more vibrators mounted to, for example, the steering wheel 172 and/or the driver's seat (not shown) to provide haptic feedback to the driver. Moreover, the driver warning device 128 may include a speaker that is operable to generate a sound or audible message within the vehicle 110.

Figure 4:
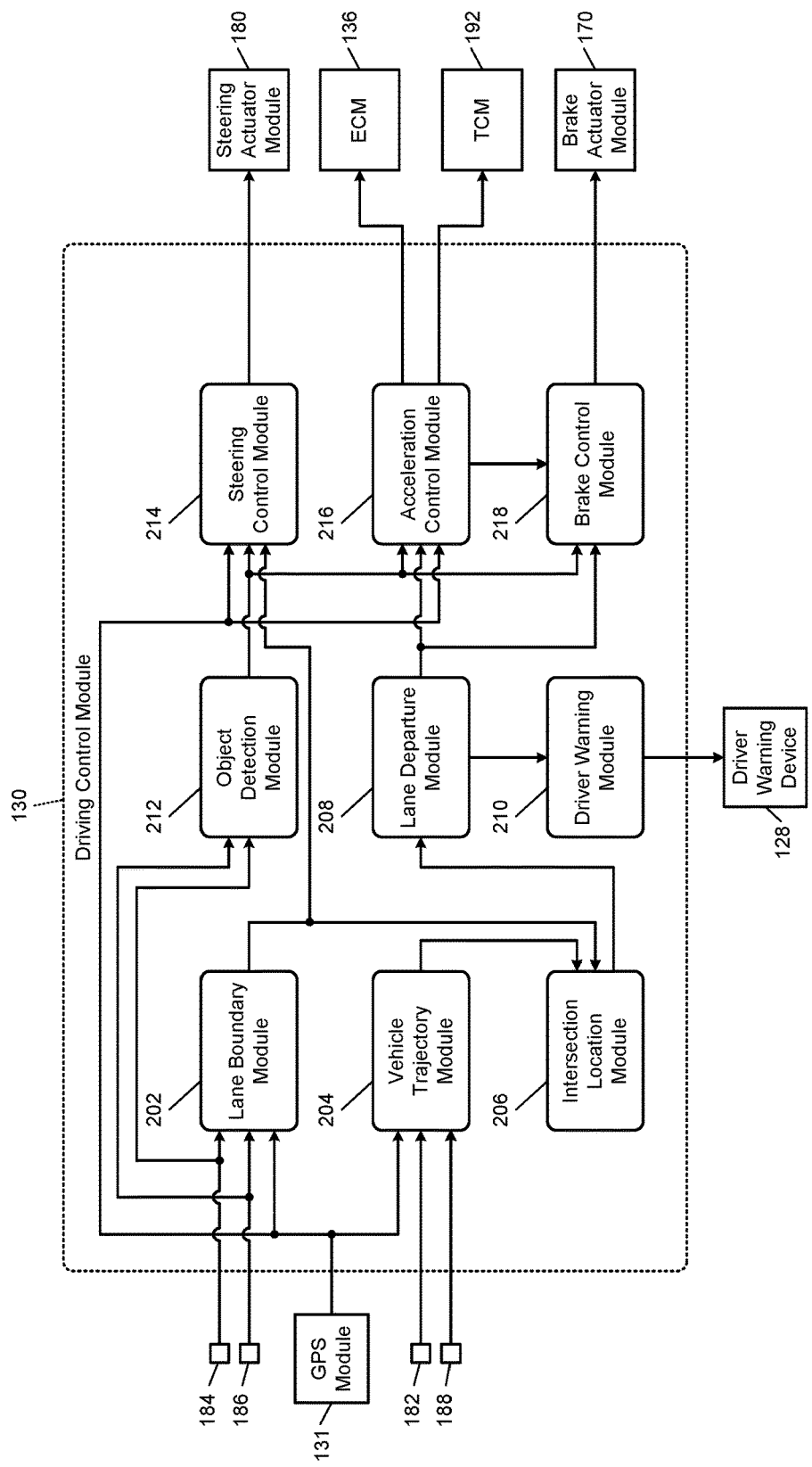
FIG. 4 is a functional block diagram of an example control system according to the principles of the present disclosure.

Referring now to FIG. 4, an example implementation of the DCM 130 includes a lane boundary module 202, a vehicle trajectory module 204, an intersection location module 206, a lane departure module 108, and a driver warning module 210. The lane boundary module 202 determines the left and right boundaries of the lane in which the vehicle 110 is traveling and outputs the lane boundaries.

The lane boundary module 202 may determine a first polynomial that represents the left lane boundary and a second polynomial that represents the right lane boundary. The lane boundary module 202 may express the first and second polynomials in terms of X and Y coordinates. The X coordinate indicates a location along the length of a road on which the vehicle 110 is travelling, and the Y coordinate indicates a location along the width of the road.

The lane boundary module 202 determines the left and right lane boundaries based on input(s) from the forward facing camera 184, the side facing cameras 186, and/or the GPS module 131. In one example, the lane boundary module 202 identifies the lane boundaries (e.g., lines) in an image generated by the forward facing camera 184 and determines polynomials that best fit the lane boundaries. In another example, the lane boundary module 202 identifies the lane boundaries in images generated by the side facing cameras 186, determines polynomials that best fit the lane boundaries, and projects the lane boundaries forward using the polynomials. In another example, the lane boundary module 202 uses a high accuracy GPS signal to identify the location of the vehicle within 0.1 meters (m) and uses a high accuracy map to identify the location of the lane boundaries relative to the vehicle within 0.1 m. The lane boundary module 202 may then determine polynomials that best fit the lane boundaries.

The lane boundary module 202 may determine the lane boundaries within a predetermined window that extends to the left and right sides of the vehicle 110 by a first predetermined distance and extends forward of the vehicle 110 by a second predetermined distance. The size of the predetermined window may correspond to the range of view of the forward facing camera 184. In one example, the predetermined window extends 120 m to the left and right of the vehicle 200 and extends 100 m in front of the vehicle 200.

When determining the lane boundaries based on images(s) generated by the forward facing camera 184 and/or the side facing cameras 186, the lane boundary module 202 may use a predetermined relationship between pixels in the image and the location of the pixels. For example, each pixel in the image may be assigned a predetermined X coordinate and a predetermined Y coordinate. Thus, the X and Y coordinates of the lane boundary may be identified based on the pixels that represent the lane boundary in the image.

The vehicle trajectory module 204 predicts the trajectory of the vehicle 110 and outputs the vehicle trajectory. The vehicle trajectory module 204 may predict the vehicle trajectory by predicting the future path(s) of one or more points on the vehicle 110 such as a point along the longitudinal axis of the vehicle 110 or points on the left and right front wheels 124 of the vehicle 110. The vehicle trajectory module 204 may represent the future path(s) using one or more lines or series of points. The vehicle trajectory module 204 may identify the location of each line or point using the X and Y coordinates. For example, the location of each point may be identified using a single pair of X and Y coordinates, and the location of each line may be identified using a polynomial that is expressed in terms of the X and Y coordinates. The vehicle trajectory module 204 may predict the vehicle trajectory within the predetermined window.

The vehicle trajectory module 204 may predict the vehicle trajectory based on the wheel speed from the wheel speed sensor 182, the vehicle acceleration(s) from the accelerometer 188, the steering wheel angle from the steering wheel angle sensor 190, and/or the vehicle location from the GPS module 131. In one example, the vehicle trajectory module 204 determines the speed of the vehicle 110 based on the wheel speed, determines the longitudinal and lateral components of the vehicle speed relative to the road (e.g., the vehicle speed in the X and Y directions) based on the vehicle location, and predicts the vehicle trajectory based on the longitudinal and lateral vehicle speeds.

The vehicle trajectory module 204 may use a kinematic model to predict the vehicle trajectory based on the longitudinal and lateral vehicle speeds, the longitudinal and lateral vehicle accelerations, and/or the steering wheel angle. The kinematic model may account for characteristics of the vehicle 110 such as wheel track and wheelbase. In addition, the kinematic model may account for the contour of the road such as whether the vehicle 110 is travelling uphill, downhill, or on an angled surface. The vehicle trajectory module 204 may determine the road contour based on the vehicle location from the GPS module 131 and a predetermined map.

The intersection location module 206 determines the location(s) where the vehicle trajectory intersects the lane boundaries and outputs the intersection location(s). For example, if the vehicle trajectory is a line representing the future path of a point along the longitudinal axis of the vehicle 110, the intersection location module 206 determines the location where that line intersects the lane boundaries. In some cases, the vehicle trajectory may only intersect one of the left and right lane boundaries. The intersection location module 206 may only identify intersection locations that occur within the predetermined window.

The lane boundary module 202 may determine the lane boundaries at a first predetermined rate (e.g., every 0.1 seconds), the vehicle trajectory module 204 may predict the vehicle trajectory a second predetermined rate, and the intersection location module 206 may determine the intersection locations at a third predetermined rate. The second determined rate may be the same as or different than the first predetermined rate, and the third predetermined rate may be the same as or different than the second predetermined rate. In one example, vehicle trajectory module 204 predicts the vehicle trajectory each time that the lane boundary module 202 determines the lane boundaries, and the intersection location module 206 determines an intersection location for each set of lane boundaries and corresponding vehicle trajectory.

In another example, the lane boundary module 202 may determine the lane boundaries a first time, the vehicle trajectory module 204 may predict trajectory at the first time, and the intersection location module 206 may determine the intersection location at the first time. The lane boundary module 202 may then determine the lane boundaries again a second time, the vehicle trajectory module 204 may predict trajectory again at the second time, and the intersection location module 206 may determine the intersection location again at the second time. In this example, the first and second times are the times at which the lane boundaries, the vehicle trajectory, and the intersection location are determined as opposed to the times at which the intersection actually occurs.

The lane departure module 208 identifies a potential lane departure when the intersection locations indicate that the vehicle 110 is likely to travel outside of the lane boundaries and outputs a signal indicating when a potential lane departure is identified. The lane departure module 208 may determine a distance between each pair of consecutively determined intersection locations and identify a potential lane departure based on the distances. For example, the lane departure module 208 may determine the distance between the intersection location determined at the first time and the intersection location determined at the second time. The lane departure module 208 may then determine whether each distance is less than a threshold, and identify a potential lane departure when at least P (e.g., 25) of the last N (e.g., 30) distances are each less than the threshold.

The lane departure module 208 may select P, N, and/or the threshold from a range of predetermined values based on the trajectory or geometry (e.g., radius) of the road on which the vehicle 110 is travelling and/or the speed of the vehicle 110. For example, lane boundary intersection locations are more likely to be clustered closer together when the vehicle 110 is making turn relative to when the vehicle 110 is travelling in a straight path. Thus, the lane departure module 108 may select a higher value for P when the vehicle 110 is about to travel through a turn relative to the value of P selected by the lane departure module 208 when the vehicle 110 is travelling in a straight path. The lane boundary module 202 and/or the lane departure module 208 may determine the geometry of the road in front of the vehicle 110 based on the lane boundaries.

The driver warning module 210 activates the driver warning device 128 to warn the driver when a potential lane departure is identified. The driver warning module 210 may initially warn the driver by activating a flashing (e.g., red) light on the driver warning device 128. The driver may respond to the warning by taking control of the vehicle 110 (e.g., by adjusting the angular position of the steering wheel 172). If the driver does not take control of the vehicle 110 within a first predetermined period, the driver warning module 210 may activate a haptic component (e.g., seat) of the driver warning device 128 in addition to the flashing light. If the driver does not take control of the vehicle 110 within a second predetermined period, the driver warning module 210 may activate an audio warning in addition to the flashing light and the haptic component. The audio warning may be a verbal warning that a potential lane departure has been identified. The first and second predetermined periods may both start when the driver warning device 128 is initially activated (e.g., when the flashing light is activated), and the second predetermined period may be greater than the first predetermined period.

The example implementation of the DCM 130 shown in FIG. 4 further includes an object detection module 212, a steering control module 214, an acceleration control module 216, and a brake control module 218. The object detection module 212 detects objects in front of the vehicle 110 based on the image(s) generated by the forward facing camera 184 and/or the side facing cameras 186. The object detection module 212 outputs a signal indicating when objects are detected in front of the vehicle 110 and the location of the objects. The object detection module 212 may express the location of the objects in terms of the X and Y coordinates.

The steering control module 214 controls the steering actuator module 180 to steer the vehicle 110 independent of a driver input such as the steering wheel angle from the steering wheel angle sensor 190. The steering control module 214 may control the steering actuator module 180 based on the image generated by the forward facing camera 184, the images generated by the side facing cameras 186, the signal output by the object detection module 212, and/or the lane boundaries output by the lane boundary module 202.

In one example, steering control module 214 controls the steering actuator module 180 to minimize a difference between the desired path of the vehicle 110 and an actual path of the vehicle 110. The desired path of the vehicle 110 may be the centerline of the lane within which the vehicle 110 is traveling. The steering control module 214 may determine the centerline of the lane based on the lane boundaries. When the object detection module 212 detects an object in front of the vehicle 110, the steering control module 214 may control the steering actuator module 180 to steer the vehicle 110 in a manner that avoids contacting the object.

The acceleration control module 216 adjusts the desired acceleration of the vehicle 110 independent of a driver input such as the accelerator pedal position. The acceleration control module 216 may adjust the desired vehicle acceleration based on the vehicle location from the GPS module 131, the signal output by the object detection module 212, and/or the signal output by the lane departure module 208. In one example, the acceleration control module 216 adjusts the desired vehicle acceleration to minimize a difference between a target speed of the vehicle 110 and an actual speed of the vehicle 110. The acceleration control module 216 may determine the target speed of the vehicle 110 based on the vehicle location from the GPS module 131 and a predetermined map indicating a government speed limit for the road corresponding to the vehicle location.

The acceleration control module 216 may decrease the desired vehicle acceleration and/or output a negative desired vehicle acceleration when the object detection module 212 detects an object in front of the vehicle 110 and/or when the lane departure module 208 identifies a potential lane departure. In response, the ECM 136 may decrease the throttle valve opening amount, decrease the fuel injection amount, retard spark timing, and/or adjust the intake and/or exhaust valve timing in order to achieve the desired vehicle acceleration (or deceleration). Additionally or alternatively, the TCM 192 may downshift the transmission 120 in order to achieve the desired vehicle acceleration (or deceleration).

The brake control module 218 controls the brake actuator module 170 to apply the friction brakes 125 of the vehicle 110 independent of a driver input such as the brake pedal position. The brake control module 218 may control the brake actuator module 170 to apply the friction brakes 125 based on the desired vehicle acceleration (or deceleration), the signal output by the object detection module 212, and/or the signal output by the lane departure module 208. In one example, the brake control module 218 controls the brake actuator module 170 to apply the friction brakes 125 when the object detection module 212 detects an object in front of the vehicle 110 and/or the lane departure module 208 identifies a potential lane departure.

In another example, the brake control module 218 controls the brake actuator module 170 to apply the friction brakes 125 in order to achieve the desired vehicle acceleration (or deceleration). The signals output by the acceleration control module 216 may indicate the portion of the desired vehicle acceleration (or deceleration) to be achieved by each of the ECM 136, the TCM 192, and the brake control module 218. The acceleration control module 216 may command the brake control module 218 to at least assist in achieving the desired vehicle acceleration (or deceleration) when the desired vehicle acceleration exceeds the negative torque capacity of the engine 114 and the transmission 120. For example, the acceleration control module 216 may command the brake control module 218 to achieve the difference between the desired vehicle acceleration (or deceleration) and the negative torque capacity of the engine 114 and the transmission 120. In turn, the brake control module 218 controls the brake actuator module 170 to apply the friction brakes 125 at a level that yields a braking torque sufficient to achieve this difference.

The acceleration control module 216 and the brake control module 218 may not decelerate the vehicle 110 unless the driver does not respond to the warning issued by the driver warning device 128 within a third predetermined period. The third predetermined period may start when the driver warning device 128 is initially activated and may be greater than the first and second predetermined periods. Thus, the acceleration control module 216 and the brake control module 218 may give the driver an opportunity to respond to the warning before decelerating the vehicle 110.

Figure 5:
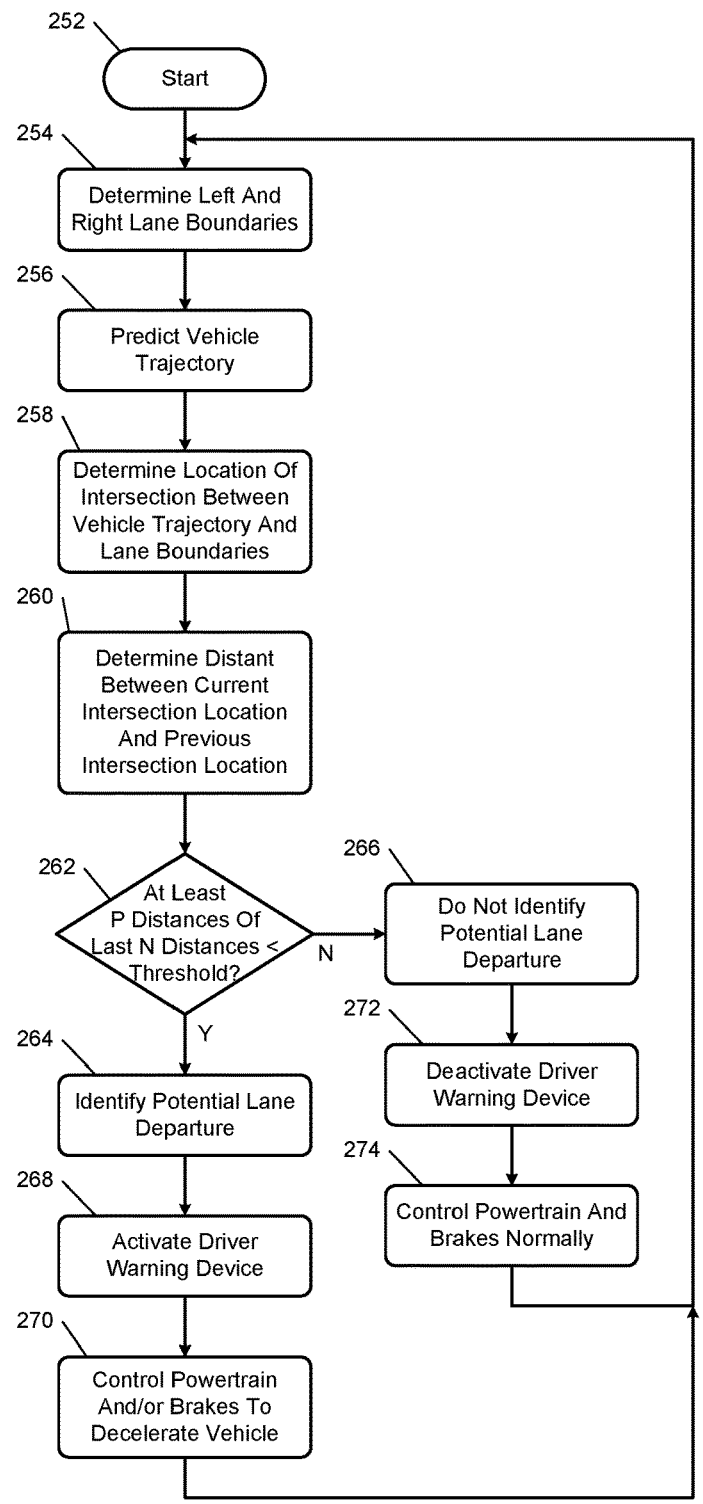
FIG. 5 is a flowchart illustrating of an example control method according to the principles of the present disclosure.

Referring now to FIG. 5, a method for predicting a possible lane departure when driving the vehicle 110 autonomously or semi-autonomously, and for taking a remedial action to prevent a lane departure begins at 252. The method is described in the context of the modules of FIG. 4.

However, the particular modules that perform the steps of the method may be different than the modules mentioned below and/or the method may be implemented apart from the modules of FIG. 4.

At 254, the lane boundary module 202 determines the left and right boundaries of the lane within which the vehicle 110 is travelling. At 256, the vehicle trajectory module 204 predicts the trajectory of the vehicle 110. At 258, the intersection location module 206 determines the location(s) of the intersection(s) between the vehicle trajectory and the lane boundaries.

At 260, the lane departure module 208 determines a distance between the intersection location determined in the current iteration and an intersection location determined in a previous iteration. The previous iteration may be the iteration that immediately precedes the current iteration. Thus, the intersection location determined in the previous iteration and the intersection location determined in the current iteration may be consecutively determined.

At 262, the lane departure module 208 determines whether at least a predetermined number P (e.g., 125) of the last N (e.g., 130) distances are each less than a threshold. If at least the predetermined number P of the last N distances are each less than the threshold, the method continues at 264. Otherwise, the method continues at 266.

At 264, the lane departure module 208 identifies a potential lane departure. At 268, the lane departure module 208 activates the driver warning device 128 to warn the driver of the potential lane departure. At 270, the lane departure module 208 controls a powertrain of the vehicle 110 and/or the friction brakes 125 of the vehicle 110 to decelerate the vehicle 110. The powertrain of the vehicle 110 includes the engine 114 and the transmission 120.

The lane departure module 208 may control the powertrain to decelerate the vehicle 110 by instructing the acceleration control module 216 to decelerate the vehicle 110. In turn, the acceleration control module 216 may output a negative desired vehicle acceleration, for example, to decelerate the vehicle 110 at a predetermined rate until the vehicle 110 stops. The ECM 136 may then decrease the throttle valve opening amount, decrease the fuel injection amount, retard spark timing, and/or adjust the intake and/or exhaust valve timing in order to achieve the negative desired vehicle acceleration. Additionally or alternatively, the TCM 192 may downshift the transmission 120 in order to achieve the negative desired vehicle acceleration. In this regard, the ECM 136 and the TCM 192 may be individually or collectively referred to as a powertrain control module.

The lane departure module 208 may control the friction brakes 125 to decelerate the vehicle 110 by instructing the brake control module 218 to decelerate the vehicle 110. In turn, the brake control module 218 may apply the friction brakes 125, for example, to decelerate the vehicle 110 at the predetermined rate until the vehicle 110 stops. In various implementations, the lane departure module 208 may simply instruct the acceleration control module 216 to decelerate the vehicle 110, and the acceleration control module 216 may control how much to use the engine 114, the transmission 120, and the friction brakes 125 in order to decelerate the vehicle 110 at the predetermined rate.

At 266, the lane departure module 208 does not identify a potential lane departure. If a potential lane departure was identified in a previous iteration, the lane departure module 208 stops identifying a potential lane departure. At 272, the lane departure module 208 deactivates the driver warning device 128. At 274, the lane departure module 208 instructs the acceleration control module 216 and the brake control module 218 to control the powertrain and the friction brakes 125, respectively, normally. In turn, the acceleration control module 216 and the brake control module 218 may stop controlling the powertrain and the friction brakes 125, respectively, to decelerate the vehicle 110 at the predetermined rate.

As discussed above, the lane departure module 208 may determine whether the distances between consecutively determined intersection locations are less than a threshold, and identify a potential lane departure when at least P (e.g., 125) of the last N (e.g., 130) distances are each less than the threshold. The threshold may be a statistical measure of the variability of Q distances between an actual path of the vehicle 200 and a desired path of the vehicle 200 when the vehicle 200 is maintained within the boundaries of a lane while being automatically steered. Q may be a predetermined number.

Figure 6:
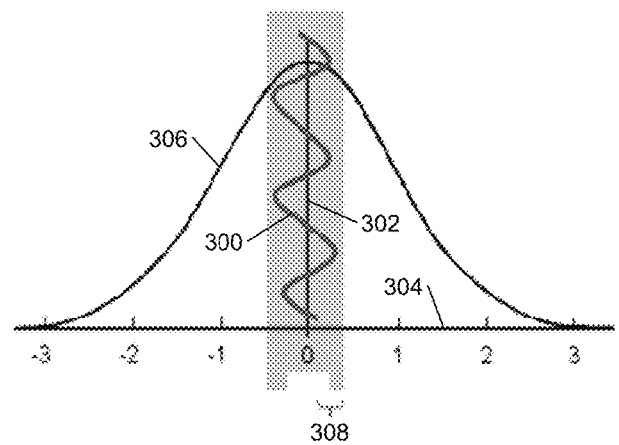
FIG. 6 is a graph illustrating an example standard deviation of a distance between a vehicle and a lane centerline when the vehicle is maintained within lane boundaries by a driving control module according to the principles of the present disclosure.

For example, referring to FIG. 6, the steering control module 214 may automatically steer the vehicle 100 to minimize the difference between an actual path 300 of the vehicle 100 and a desired path 302 of the vehicle 100. The actual and desired paths 300 and 302 are plotted with respect to a y-axis 304 that indicates a location along a width of a road on which the vehicle 100 is travelling. The Q distances between the actual and desired paths 300 and 302 in the Y direction (i.e., in the direction along the y-axis 304) may be characterized by a bell curve 306 and may have a standard deviation 308. The threshold used by the lane departure module 108 to identify a potential lane departure may be equal to the standard deviation of the Q distances.

Figure 7A:
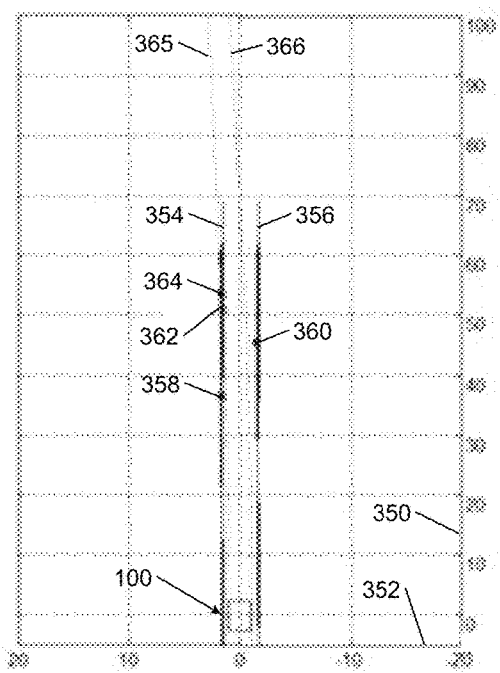
FIG. 7A is a graph illustrating example trajectories of a vehicle when the vehicle is maintained within lane boundaries by a driving control module according to the principles of the present disclosure.

FIG. 7A illustrates examples of vehicle trajectories predicted by the vehicle trajectory module 104 and intersection locations determined by the intersection location module 106 when the steering control module 214 is behaving normally (e.g., automatically steering the vehicle 100 within lane boundaries). The lane boundaries and the predicted vehicle trajectories are plotted with respect to an x-axis 350 and a y-axis 352. The x-axis 350 indicates a location along a length of a road on which the vehicle 100 is travelling relative to a current location of the vehicle 100. The y-axis 352 indicates a location along a width of the road relative to the current location of the vehicle 100.

The lane boundaries include a left boundary 354 and a right boundary 356. The predicted vehicle trajectories include a first trajectory that intersects the left boundary 354 at a first location 358, a second trajectory that intersects the right boundary 356 at a second location 360, a third trajectory that intersects the left boundary 354 at a third location 362, and a fourth trajectory that intersects the left boundary 354 at a fourth location 364. For purpose of clarity, only the fourth trajectory is shown. The fourth trajectory includes a future path 365 of the left front wheel 124 of the vehicle 100 and a future path 366 of the right front wheel 124 of the vehicle 100.

Figure 7B:
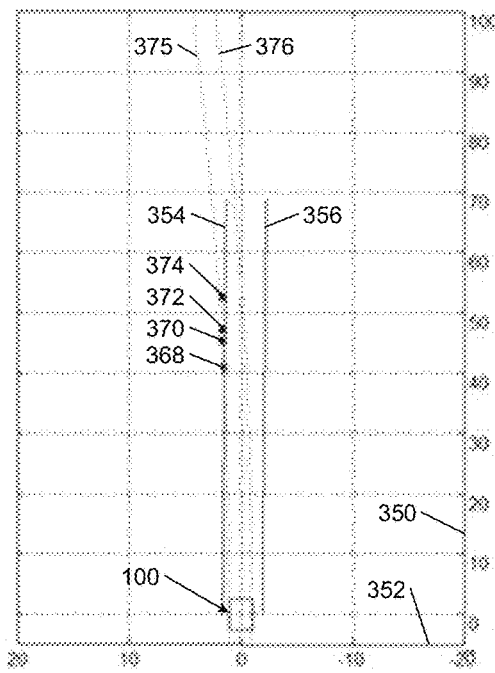
FIG. 7B is a graph illustrating example trajectories of a vehicle that may cause a lane departure module according to the principles of the present disclosure to identify a potential lane departure.

FIG. 7B illustrates examples of vehicle trajectories predicted by the vehicle trajectory module 104 and intersection locations determined by the intersection location module 106 when the steering control module 214 is not behaving normally (e.g., automatically steering the vehicle 100 in a manner that may cause the vehicle 100 to travel outside of the lane boundaries). The lane boundaries and the predicted vehicle trajectories are plotted with respect to the x-axis 350 and the y-axis 352.

The lane boundaries include the left boundary 354 and the right boundary 356. The predicted vehicle trajectories include a first trajectory that intersects the left boundary 354 at a first location 368, a second trajectory that intersects the right boundary 356 at a second location 370, a third trajectory that intersects the left boundary 354 at a third location 372, and a fourth trajectory that intersects the left boundary 354 at a fourth location 374. For purpose of clarity, only the fourth trajectory is shown. The third trajectory includes a future path 375 of the left front wheel 124 of the vehicle 100 and a future path 376 of the right front wheel 124 of the vehicle 100.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   a lane boundary circuit configured to determine a boundary of a lane within which a vehicle is travelling;
   a vehicle trajectory circuit configured to predict a trajectory of the vehicle;
   an intersection location circuit configured to determine M locations of M intersections between the vehicle trajectory and the lane boundary at M times, wherein M is an integer greater than one;
   a lane departure circuit configured to:
      determine a distance between two of the M locations that are consecutively determined; and
      identify a potential lane departure based on the distance; and
   a driver warning circuit configured to activate a driver warning device to warn a driver when the potential lane departure is identified.

2. The system of claim 1 wherein the lane departure circuit is configured to:
   determine N distances between N pairs of the M locations that are consecutively determined; and
   identify the potential lane departure based on the N distances, wherein N is an integer greater than one.

3. The system of claim 2 wherein the lane departure circuit is configured to identify the potential lane departure when at least P of the N distances are less than a threshold, and P is an integer greater than one.

4. The system of claim 3 further comprising a steering control circuit configured to control a steering actuator to steer the vehicle independent of a driver input, wherein the threshold indicates a variability of Q distances between an actual path of the vehicle and a desired path of the vehicle when the vehicle is maintained within the lane boundary while being steered independent of the driver input, and Q is an integer greater than one.

5. The system of claim 3 wherein the lane departure circuit is configured to adjust at least one of the threshold and P based on a radius of the lane boundary.

6. The system of claim 1 wherein:
   the intersection location circuit is configured to identify each of the M locations using an X coordinate and a Y coordinate;
   the X coordinate indicates a location along a length of a road on which the vehicle is travelling; and
   the Y coordinate indicates a location along a width of the road on which the vehicle is travelling.

7. The system of claim 1 wherein the lane boundary circuit is configured to determine the lane boundary based on an input from a forward facing camera mounted on the vehicle, a side facing camera mounted on the vehicle, and a global positioning system.

8. The system of claim 1 wherein the vehicle trajectory circuit is configured to predict the vehicle trajectory based on at least one of a wheel speed, vehicle acceleration, a steering wheel angle, and an input from a global positioning system.

9. The system of claim 1 further comprising at least one of:
   a powertrain control circuit configured to control a powertrain of the vehicle to decelerate the vehicle when the potential lane departure is identified; and
   a brake control circuit configured to control a friction brake of the vehicle to decelerate the vehicle when the potential lane departure is identified.

10. A method comprising:
    determining a boundary of a lane within which a vehicle is travelling;
    predicting a trajectory of the vehicle;
    determining M locations of M intersections between the vehicle trajectory and the lane boundary at M times, wherein M is an integer greater than one;
    determining a distance between two of the M locations that are consecutively determined; and
    identifying a potential lane departure based on the distance; and
    activating a driver warning device to warn a driver when the potential lane departure is identified.

11. The method of claim 10 further comprising:
    determining N distances between N pairs of the M locations that are consecutively determined; and
    identifying the potential lane departure based on the N distances, wherein N is an integer greater than one.

12. The method of claim 11 further comprising identifying the potential lane departure when at least P of the N distances are less than a threshold, and P is an integer greater than one.

13. The method of claim 12 further comprising controlling a steering actuator to steer the vehicle independent of a driver input, wherein the threshold indicates a variability of Q distances between an actual path of the vehicle and a desired path of the vehicle when the vehicle is maintained within the lane boundary while being steered independent of the driver input, and Q is an integer greater than one.

14. The method of claim 12 further comprising adjusting at least one of the threshold and P based on a radius of the lane boundary.

15. The method of claim 10 further comprising identifying each of the M locations using an X coordinate and a Y coordinate, wherein:
    the X coordinate indicates a location along a length of a road on which the vehicle is travelling; and
    the Y coordinate indicates a location along a width of the road on which the vehicle is travelling.

16. The method of claim 10 further comprising determining the lane boundary based on an input from a forward facing camera mounted on the vehicle, a side facing camera mounted on the vehicle, and a global positioning system.

17. The method of claim 10 further comprising predicting the vehicle trajectory based on at least one of a wheel speed, vehicle acceleration, a steering wheel angle, and an input from a global positioning system.

18. The method of claim 10 further comprising at least one of:

controlling a powertrain of the vehicle to decelerate the vehicle when the potential lane departure is identified; and controlling a friction brake of the vehicle to decelerate the vehicle when the potential lane departure is identified.

* * * * *